May 30, 1961     V. A. SMATHERS ET AL     2,986,438
AUTOMOBILE SERVICE TRAY
Filed July 17, 1959     2 Sheets-Sheet 1
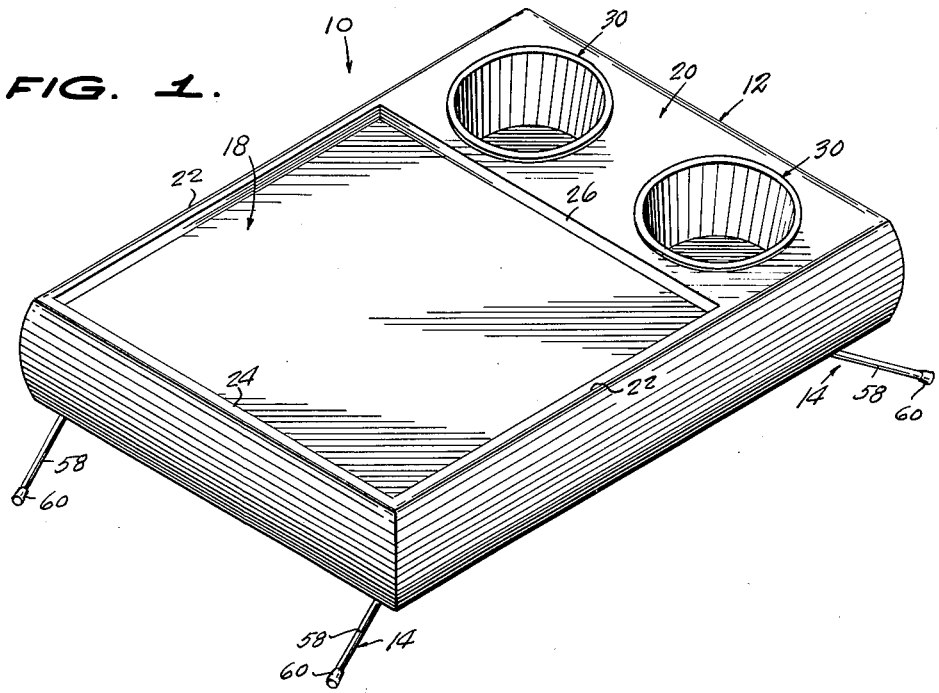
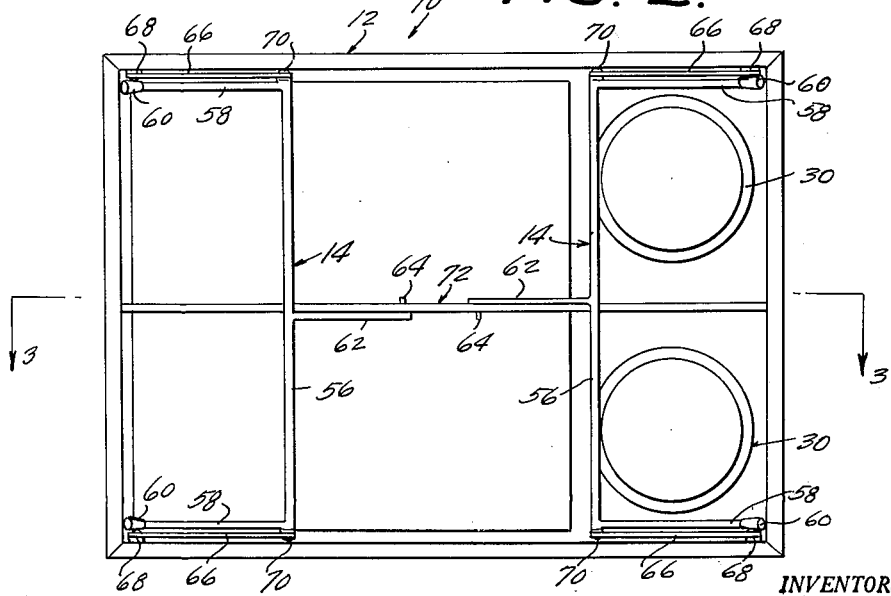
INVENTORS
KEENER M. SMATHERS,
VANCE A. SMATHERS,
BY
McMorrow, Berman & Davidson
ATTORNEYS.

May 30, 1961 V. A. SMATHERS ET AL 2,986,438
AUTOMOBILE SERVICE TRAY
Filed July 17, 1959 2 Sheets-Sheet 2
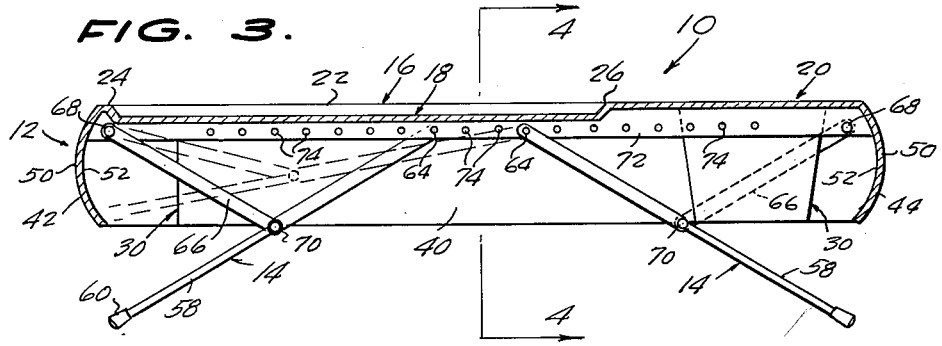
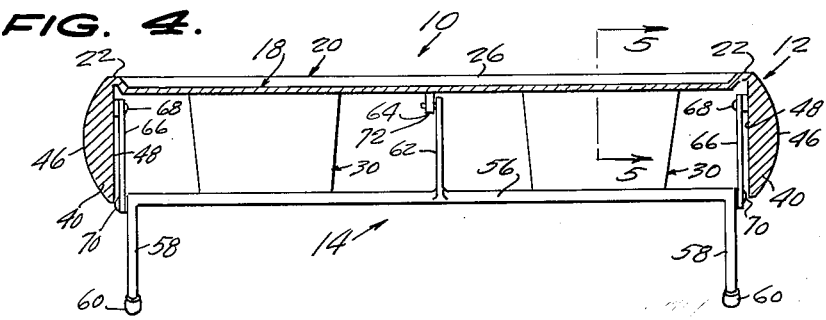
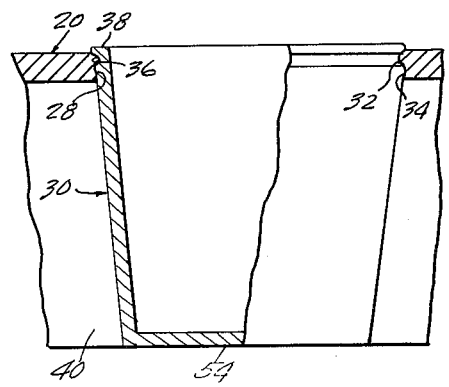
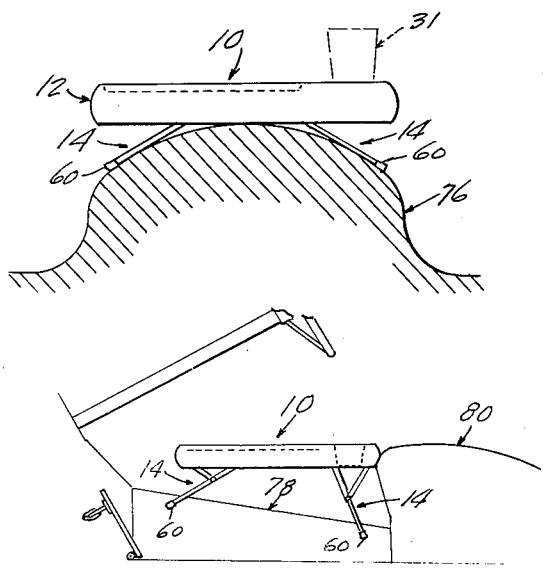
INVENTORS
KEENER M. SMATHERS,
VANCE A. SMATHERS,
BY
McMorrow, Berman & Davidson
ATTORNEYS.

United States Patent Office 2,986,438
Patented May 30, 1961

2,986,438
AUTOMOBILE SERVICE TRAY
Vance A. Smathers, Lake Junaluska, N.C. (1904 Walton St., Petersburg, Va.), and Keener M. Smathers, Lake Junaluska, N.C.

Filed July 17, 1959, Ser. No. 827,858
9 Claims. (Cl. 311—21)

This invention relates to a novel flexible service table for use in passenger automobiles for holding and serving beverages and food.

The primary object of the invention is to provide a safer, more practical, efficient, and more conveniently usable table of the kind indicated, which can be supported upon any suitable part of an automobile, including seats thereof, but which is primarily designed to be supported on the floor, in straddling relation to the front transmission floor hump or the rear drive shaft hump, so that shifting of the table is precluded, when the automobile is under way and encounters road bumps and swerves, as in taking road curves.

Another object of the invention is to provide an easily adjustable and rigid table of the character indicated above which has two sets of legs which are adjustable independently of each other, for levelling the table on uneven or slanted surfaces, and has secure and easily operated locking means for locking the leg sets in adjusted positions, the table top being hollow and receiving the leg sets therein, when folded.

A further object of the invention is to provide a table of the character indicated above, wherein each set of legs is composed of a pair of legs which have non-slip tips or feet for engaging a supporting surface, wherein in all adjusted positions of the legs, the tips or feet remain in locations at the corners of the table top, so as to provide, in all adjusted positions, wide and stable support for the table when unfolded.

A still further object of the invention is to provide a table of the character indicated above which is simple in construction, has a low flat profile, when folded, so that the table can be readily and conveniently stored, when not in use, as under the front seat of an automobile, and which can be made in attractive and rugged forms at relatively low cost, from a variety of readily available materials, such as plastics and lightweight metals.

Other important objects and advantageous features of the invention will become apparent from the following description and the accompanying drawings, wherein, for purposes of illustration only, a specific form of the invention is set forth in detail.

In the drawings:

Figure 1 is a perspective view of a table of the invention with its leg unfolded to supporting position;

Figure 2 is a bottom plan view of the table;

Figure 3 is a vertical longitudinal section taken on the line 3—3 of Figure 2;

Figure 4 is a vertical transverse section taken on the line 4—4 of Figure 3;

Figure 5 is an enlarged fragmentary vertical longitudinal section, taken on the line 5—5 of Figure 4;

Figure 6 is a schematic sectional view, on a reduced scale, showing the table unfolded with its legs straddling an automobile floor hump; and Figure 7 is a schematic view, on a further reduced scale, showing the table straddling the transmission hump of an automobile floor, with the legs adjusted to level the table.

Referring in detail to the drawings, wherein like numerals designate like parts throughout the several views, the illustrated table, generally designated 10, comprises a table top or body 12, which is preferably of elongated rectangular form, and a pair of similar foldable leg assemblies 14.

The table top or body 12 has a top wall 16 which has a flat main portion 18 which is depressed below and is parallel to a minor portion 20, at one end of the top, so that, upstanding relative to the main portion 18, are side rails 22, and first and second end rails 24 and 26, respectively, which serve to retain food and food plates or containers against sliding off the main portion 18.

The minor portion 20 is also flat, and is formed with a plurality of centered circular openings 28, which are spaced thereacross, to receive removable cups 30, which serve as non-tippable holders for such as beverage glasses 31 or bottles. The cups 30 snap into and out of place in the openings 28, by virtue of rounded internal beads 32 which extend around the edges 34 of the openings and which snap into circumferential external grooves 36 provided in the cups 30 near their upper edges 38.

The table top or body 12 is preferably a hollow, inverted pan-shaped form, having depending side walls 40 and first and second end walls 42 and 44 which depend from the top wall 16. The top or body 12, as shown in Figures 3 and 4, is preferably an integral form, wherein the side walls 40 are relatively thick and are of solid segmented cross section, affording convex outer surfaces 46 and flat inner surfaces 48, which are normal to the top wall 16. The end walls 42 and 44 are relatively thin and have convex outer sides 50 and concave inner sides 52. The cups 30, as seen in Figures 3, 4 and 5, are proportioned in height so that their bottoms 54 do not project downwardly beyond the table top walls and are preferably on a level with the lower edges of these walls.

Each of the similar leg assemblies 14 comprises a rigid U-shaped form having a straight horizontal bight portion 56 which terminates at its ends in relatively short straight depending legs 58, which have anti-slip feet or tips 60 on their free lower ends. At the middle of the bight portion 56 and extending in the plane of the legs 58 is a single upstanding resilient locking arm 62 which is provided, at its upper end, with a lateral locking pin 64.

The leg assemblies 14 are articulated to the table top 12 by means of links 66 which are suitably and fixedly pivoted, at their upper ends, as indicated at 68, to the table top side walls 40, at the inner surfaces 48 thereof, at locations close to the top wall 16 and close to related end walls 42, 44. The links 68 are suitably pivoted, as indicated at 70, at their lower ends, to the upper ends of the legs 58, in line with the bight portion 56, and at the outer sides of the legs. The links 66 are preferably of substantially the same length as the locking arms 62.

As shown in Figures 2, 3 and 4, a longitudinal detent bar 72 is fixed centrally to and depends from the table top 16 and is provided therealong with spaced detent holes 74, in which the locking pins 64 on the locking arms 62, are selectively engageable, in the folded and in the unfolded positions of the leg assemblies 14, so as to retain the same in such positions. As is apparent in Figure 2, the locking arms 62 are preferably slightly displaced relative to each other and lengthwise of their bight portions 56, so that the locking arms are located at opposite sides of the detent bar 72, and their pins 64 engage in the detent holes 74 from opposite sides of the detent bar 72, the locking arms 62 being tensioned toward related sides of the bar 72 so as to yieldably retain the pins 64 in selected detent holes.

As shown in Figure 6, the table 10 is adapted to be supported securely upon an automobile floor hump 76, or other similar support, with the table top 12 extending lengthwise across the hump, and with the leg assemblies 14 similarly adjusted and locked in unfolded spread positions, wherein the leg assemblies and the anti-slip feet 60 bear upon opposite sides of the hump, and prevent sliding and tilting of the table, even when the automobile is being driven over rough roads and around curves.

Figure 7 shows the table supported on a transmission floor hump 78, in front of the driver's seat 80, with the table top 16 extending lengthwise of the hump, and with the legs 58 of the assemblies 14 straddling and bearing in non-skid and non-tilt manner, on opposite sides of the hump. When the hump 78 is inclined, as shown, the leg assemblies 14 are independently adjusted so as to level the table top 12.

As shown in phantom lines in Figure 3, the leg assemblies 14 can be folded and locked entirely within the table top 12, so as to avoid any projection thereof below the open bottom of the table top, so that in folded condition, the table 10 is as flat and unobstructed as the table top 12, for easy storage of the table, as under the driver's seat 80.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An automobile service table comprising a table top, a pair of similar foldable leg assemblies comprising links having upper ends pivoted to the table top adjacent to related ends thereof, said links having lower ends, inverted U-shaped forms having bight portions having depending legs on their ends, the lower ends of the links being pivoted to the ends of the bight portions, said bight portions having single upstanding locking arms thereon, a single detent bar fixed to the table top and extending between the ends of the table top, and detent means comprising a plurality of detent elements spaced along said detent bar and detent members on the locking arms which are selectively engageable with detent elements of the detent bar.

2. An automobile service table comprising a table top, a pair of similar foldable leg assemblies comprising links having upper ends pivoted to the table top adjacent to related ends thereof, said links having lower ends, inverted U-shaped forms having bight portions having depending legs on their ends, the lower ends of the links being pivoted to the ends of the bight portions, said bight portions having single upstanding locking arms thereon, a single detent bar fixed to the table top and extending between the ends of the table top, and detent means comprising a plurality of detent elements spaced along said detent bar and detent members on the locking arms which are selectively engageable with detent elements of the detent bar, said detent elements being holes in the detent bar, and said detent members being lateral locking pins on the locking arms, the locking arms being resilient and tensioned toward the detent bar to hold the locking pins yieldably engaged in detent holes, in both the folded and unfolded positions of the leg assemblies.

3. An automobile service tray comprising a table top having ends and sides, longitudinal detent bar means mounted on and extending lengthwise of the table top at the underside thereof, a pair of similar leg assemblies comprising inverted U-shaped members having bight portions extending crosswise of the table top and downwardly extending laterally spaced legs fixed on the bight portions, laterally spaced links having upper ends pivoted to the table top and lower ends pivoted to the ends of the bight portions, a single longitudinally inwardly and upwardly angled locking arm fixed on each bight portion and having an upper end, the locking arms being resilient and biased toward the detent bar, said detent bar means having spaced holes extending therealong and said locking arms having lateral detent pins at their upper ends selectively engageable in holes of the detent bar means.

4. An automobile service table comprising a table top, a pair of similar foldable leg assemblies comprising links having upper ends pivoted to the table top adjacent to related ends thereof, said links having lower ends, inverted U-shaped forms having bight portions having depending legs on their ends, the lower ends of the links being pivoted to the ends of the bight portions, said bight portions having single upstanding locking arms thereon, a single detent bar fixed to the table top and extending between the ends of the table top, and detent means comprising a plurality of detent elements spaced along said detent bar and detent members on the locking arms which are selectively engageable with detent elements of the detent bar, said table top being of inverted pan shape having an open bottom through which the leg assemblies are foldable from folded positions within the table top to unfolded positions reaching below the table top, the legs of the leg assemblies having free lower ends which are located in the regions of the corners of the table top in the folded and unfolded positions of the leg assemblies.

5. An automobile service table comprising an inverted pan-shaped top having a top wall and side walls and first and second end walls which depend from the top wall, said table top having an open bottom, a pair of similar foldable leg assemblies each comprising links having upper ends pivoted to the inner surfaces of the side walls near to the top wall and near to related end walls, said links having lower ends, an inverted U-shaped form having a bight portion extending crosswise of the table top and having fixed depending legs on its ends, said legs having free lower ends, the lower ends of the links being pivoted to the legs in line with the bight portions, single upstanding locking arms on the bight portions having upper ends, a single longitudinal detent bar fixed to and depending from the table top, detent elements on and spaced along the detent bar, and detent members on the upper ends of the locking arms, said detent members being engageable with selected ones of the detent elements to hold the leg assemblies folded within the table top, and to hold the leg assemblies in unfolded positions extending below the table top.

6. An automobile service tray comprising a table top having ends and sides, longitudinal detent bar means mounted on and extending lengthwise of the table top at the underside thereof, a pair of similar leg assemblies comprising inverted U-shaped members having bight portions extending crosswise of the table top and downwardly extending laterally spaced legs fixed on the bight portions, laterally spaced links having upper ends pivoted to the table top and lower ends pivoted to the ends of the bight portions, a single longitudinally inwardly and upwardly angled locking arm fixed on each bight portion and having an upper end, the locking arms being resilient and biased toward the detent bar, said detent bar means having spaced holes extending therealong and said locking arms having lateral detent pins at their upper ends selectively engageable in holes of the detent bar means, said detent bar means being centered between the sides of the table top.

7. An automobile service tray comprising a table top having ends and sides, longitudinal detent bar means mounted on and extending lengthwise of the table top at the underside thereof, a pair of similar leg assemblies comprising inverted U-shaped members having bight portions extending crosswise of the table top and downwardly extending laterally spaced legs fixed on the bight portions, laterally spaced links having upper ends pivoted to the table top and lower ends pivoted to the ends of the bight portions, a single longitudinally inwardly and upwardly angled locking arm fixed on each bight portion and having an upper end, the locking arms being resilient and biased toward the detent bar, said detent bar means having spaced holes extending therealong and said locking arms having lateral detent pins at their upper end selectively engageable in holes of the detent bar means, said detent bar means being centered between the sides of the table top, and said locking arms being located to engage opposite sides of the detent bar means.

8. An automobile service tray comprising a table top having ends and sides, longitudinal detent bar means mounted on and extending lengthwise of the table top at the underside thereof, a pair of similar leg assemblies comprising inverted U-shaped members having bight portions extending crosswise of the table top and downwardly extending laterally spaced legs fixed on the bight portions, laterally spaced links having upper ends pivoted to the table top and lower ends pivoted to the ends of the bight portions, a single longitudinally inwardly and upwardly angled locking arm fixed on each bight portion and having an upper end, the locking arms being resilient and biased toward the detent bar, said detent bar means having spaced holes extending therealong and said locking arms having lateral detent pins at their upper ends selectively engageable in holes of the detent bar means, said links, said legs, and said locking arms being proportioned in length to enable the leg assemblies to be folded to storage position entirely beneath the table top, with the locking arm pins disengaged from the detent bar holes.

9. An automobile service tray comprising a table top having ends and sides, longitudinal detent bar means mounted on and extending lengthwise of the table top at the underside thereof, a pair of similar leg assemblies comprising inverted U-shaped members having bight portions extending crosswise of the table top and downwardly extending laterally spaced legs fixed on the bight portions, laterally spaced links having upper ends pivoted to the table top and lower ends pivoted to the ends of the bight portions, a single longitudinally inwardly and upwardly angled locking arm fixed on each bight portion and having an upper end, the locking arms being resilient and biased toward the detent bar, said detent bar means having spaced holes extending therealong and said locking arms having lateral detent pins at their upper ends selectively engageable in holes of the detent bar means, said links, said legs, and said locking arms being proportioned in length to enable the leg assemblies to be folded to storage position entirely beneath the table top, with the locking arm pins disengaged from the detent bar holes, said table top having depending side walls and end walls having lower edges which extend below the leg assemblies in their storage positions.

References Cited in the file of this patent

UNITED STATES PATENTS

| | | |
|---|---|---|
| 631,556 | Bushwell | Aug. 22, 1899 |
| 1,138,156 | Stroud | May 4, 1915 |
| 1,232,874 | Whealen | July 10, 1917 |
| 1,560,912 | Johnson | Nov. 10, 1925 |
| 2,723,888 | Bally | Nov. 15, 1955 |
| 2,758,899 | Smith et al. | Aug. 14, 1956 |
| 2,785,936 | Cirkick | Mar. 19, 1957 |
| 2,814,541 | Derman | Nov. 26, 1957 |
| 2,825,611 | Aynesworth | Mar. 4, 1958 |